Inventor
ALFRED TURLEY

Inventor
ALFRED TURLEY
By
Attorney

United States Patent Office 2,982,142
Patented May 2, 1961

2,982,142

REVERSING GEAR FOR HELICAL WIRE FEED ROLLERS IN SPRING UNIT LACING MACHINES

Alfred Turley, Bushbury, Wolverhampton, England, assignor to Vono Limited, Tipton, England, a company of Great Britain Filed Oct. 9, 1959, Ser. No. 845,484

4 Claims. (Cl. 74—361)

This invention relates to a spring unit lacing machine of the type which is illustrated in British patent specification No. 653,021 and also in our co-pending U.S.A. application Serial No. 844,448, filed October 5, 1959

Such machine comprises generally an elongated upper frame carrying a number of clamping jaws and a similar elongated lower frame also carrying clamping jaws and both frames at one end have mechanism which forms and advances a wire helix for lacing together coiled springs which are clamped in position between the two sets of clamping jaws. Each such mechanism for producing a wire helix comprises a die through which wire is fed by a pair of co-operating feed rollers rotating about spaced apart vertical axes and the drive for such feed rollers is by means of a primary driving shaft which is uni-directional in rotation and a secondary shaft spaced therefrom, the primary shaft having a gear wheel which meshes with a gear wheel on the secondary shaft to transmit drive thereto.

Also in each such mechanism the primary shaft has clutch means for connecting its gear wheel in driving engagement with the primary shaft and for connecting the feed roller of the primary shaft in driving engagement with the primary shaft, whilst the gear wheel and feed roller of the secondary shaft are both fixed to this shaft so that normally for forward feeding the primary shaft clutch means is engaged and thus both feed rollers are driven in the forwards direction.

However, with this arrangement, if the advancing helix encounters obstruction such as a misplaced spring it will be halted and to clear the obstruction the operator has to cut off the helix adjacent the die and withdraw it from the spring unit by screwing it outwardly.

The object of the present invention is to provide a simple and inexpensive form of reversing gear to enable the feed rollers to be driven in the reverse direction so that if required the helix can be drawn back through the die if any obstruction is encountered so as to allow such obstruction to be cleared and the forward drive of the helix re-started.

According to the present invention I provide a reversing gear for this purpose comprising a primary sprocket fixed to the primary shaft, a secondary sprocket mounted loosely about the secondary shaft, a chain connecting the two sprockets and a clutch device on the secondary shaft for coupling said secondary sprocket into driving engagement with the secondary shaft when it is required to reverse the rotation of the feed rollers, the clutch means of the primary shaft being disengaged at such time.

Instead of sprockets and chain, any equivalent gearing such as pulleys and belt may be used and thus the expression "sprocket" and "chain" as used herein are to be taken as being generic terms covering any equivalent form of gearing.

In a simple and convenient form of the invention there may be a secondary sprocket which is loosely mounted for rotation upon a sleeve which is in driving engagement with the secondary shaft, and the secondary sprocket may have a projection on one face while such sleeve may have a sliding key mounted therein so that such key can be moved radially into the path of movement of the projection on the secondary sprocket whereby drive is then transmitted to the secondary shaft by the secondary sprocket.

The invention is illustrated in the accompanying drawings which show its application to the machine described in our co-pending application Serial No. 844,448. In the drawings.

Figure 1:
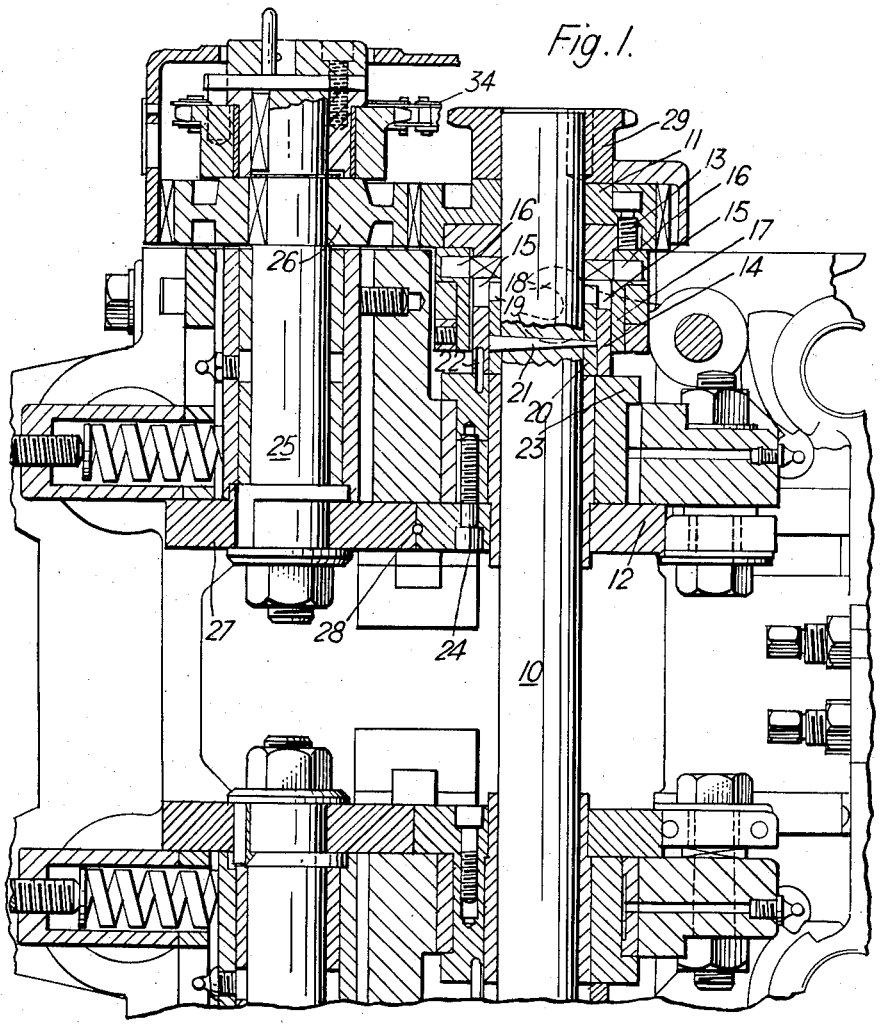
Figure 1 is a vertical section through the arrangement of upper and lower feed rollers, only the upper part being shown in full.

In the embodiment of the invention shown in the drawings, the reversing gear is incorporated in the drive to both upper and lower feed rollers and as each arrangement is exactly similar only the upper one is described hereinafter it being understood that the lower reversing gear will be exactly similar but will be inverted and operated from underneath (see Figure 1).

Referring to Figure 1 of the drawing the vertically extending primary shaft 10 has mounted thereon a gear wheel 11 and one of the feed rollers 12 and a clutch is provided for simultaneously clutching the gear wheel 11 and roller 12 into driving engagement with the primary shaft 10.

The operation of the clutch does not form part of the present invention and it is actuated by means (not shown) in timed relationship with the other operations of the machine as referred to in our prior application aforesaid. For a complete understanding of the present invention it is sufficient for the details of the clutch to be described as shown in Figure 1.

It will be seen that the gear wheel 11 is fixed by bolts 13 to the flange of a sleeve 14 which has a pair of axially extending slots 15 in its wall and in each of these slots 15 there is slidably engaged one of a pair of driving pegs 16 fixed in a collar 17 which is capable of axial up and down movement.

Movement of collar 17 is brought about by the pivoted yoke 18 which engages trunnions on the collar to move the pegs 16 into and out of engagement with slots 19 in the end of a sleeve 20 which is fixed to the primary shaft 10 by means of peg 21.

The sleeve 14 is fixed by dowels 22 to a further sleeve 23 which, in turn, is fixed to feed roller 12 by bolts 24. When the collar 17 is moved axially downwards by the yoke 18, both gear wheel 11 and feed roller 12 are clutched to primary shaft 10. With the clutch out of engagement these two (11 and 12) can rotate freely relative to shaft 10.

The secondary shaft 25 which is parallel to the primary shaft 10 has a gear wheel 26 fixed thereon and keyed thereto and this gear wheel 26 is in constant mesh with the gear wheel 11 of the primary shaft. The other feed roller 27 is suitably secured to the end of the secondary shaft 25 so that it engages the feed roller 12 on the primary shaft to feed the wire 28 through to the helix-forming die (not shown).

Figure 2:
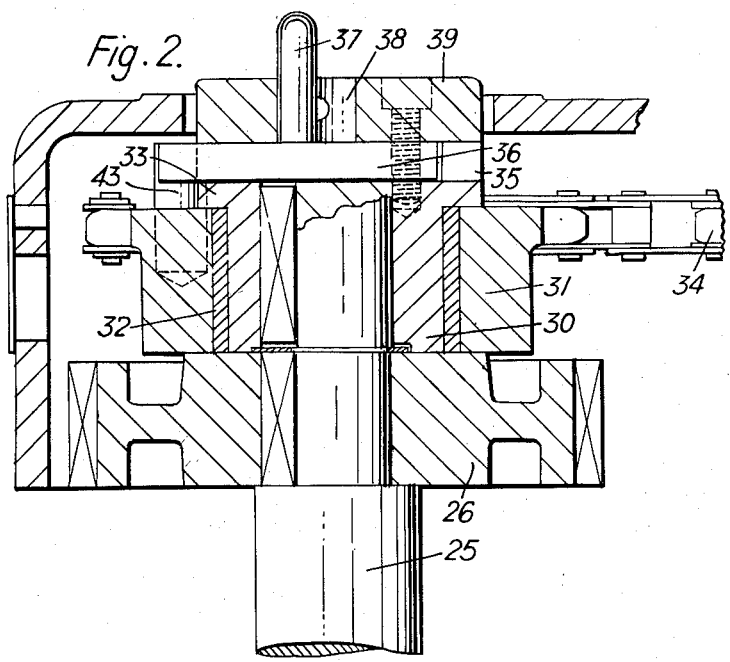
Figure 2 is an enlarged detail view of part of Figure 1.
Figure 3:
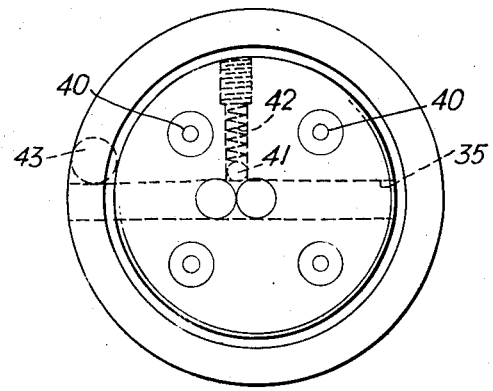
Figure 3 is a part plan view on Figure 2.

For the reversing arrangement the upper end of the primary shaft 10 has a chain sprocket 29 keyed thereto and the upper end of the secondary shaft 25 is fitted with a sleeve 30 (see Figure 2) which is also keyed to the secondary shaft 25. The secondary sprocket 31 is loosely mounted upon a bush 32 fixed to the outside of said sleeve 30 and above the bush 32 the sleeve has an enlarged flange portion 33. An endless chain 34 connects the secondary and the primary sprockets.

The flange 33 of the sleeve 30 is provided with a diametrically extending slot 35 and a bar section key 36 is mounted in this slot, the key being of a length equal to the diameter of the flange so that normally the ends of the key do not project beyond the flange.

On its upper face the key 36 has a projecting peg 37 which projects through an opening 38 formed in cap member 39 which is secured to the flange 33 by suitable bolts 40. A spring-loaded ball detent 41 is mounted in a transverse passage 42 in the cap member 39 and this is adapted to engage the peg 37 to locate the key 36 more positively in either its extended position (Figure 2) or its retracted position.

Normally for forward drive of the feed collar the sliding key 36 is retracted so that it does not project beyond the outside of the flange 33 in which it slides and during normal forward drive the secondary sprocket 31 simply runs freely upon the outside of the bush 32 and the actual drive is between the meshing gear wheels 11 and 26 on the primary and the secondary shafts respectively.

The upper face of the secondary sprocket 31 has fixed therein an axially projecting peg 43 and when the sliding key 36 is moved to project beyond the outside of the flange 33, the end 44 of the key lies in the path of movement of the peg 43 on the secondary sprocket, so that as the secondary sprocket rotates its peg 43 will engage the key 36 and cause the sleeve 30 to turn, which being keyed to the secondary shaft 25 will turn the secondary shaft.

To reverse the direction of rotation of the feed rollers 12 and 27 the key 36 is moved to cause its end 44 to project and the clutch driving pegs 16 on the primary shaft 10 are disengaged so that no drive is transmitted from shaft 10 to the primary shaft gear wheel 11 but the primary shaft sprocket 29 still rotates and transmits the drive to the secondary shaft sprocket 26 which will then engage the projecting key 36 with its peg 43 and cause the drive to be transmitted to the secondary shaft 25. The gear wheel 26 of the secondary shaft will thereby transmit the drive to the gear wheel 11 of the primary shaft but drive will now be in the reverse direction because it is being transmitted by the chain 34 and the two sprockets 29 and 31.

The invention therefore proves a simple and inexpensive reversing arrangement which involves very little modification to the machine and is such that it can be applied quite simply to an existing machine. As the feed rollers 12 and 27 can now be reversed in rotation the operation of clearing an obstruction can be carried out more rapidly and there need be no wastage of wire because the withdrawn helical wire is straightened out in passing rearwardly through the die and can be used again when the obstruction has been cleared.

What I claim then is:

1. In a spring unit lacing machine of the type referred to, means for reversing the direction of rotation of the helical wire feed rollers comprising; a primary driving shaft which is uni-directional in rotation, a feed roller mounted thereon, a gear wheel mounted on the primary shaft, clutch means for simultaneously connecting said primary shaft in driving engagement with said feed roller and gear wheel, a secondary shaft in spaced parallel relationship with said primary shaft, a feed roller fixed on said secondary shaft, a gear wheel fixed upon said secondary shaft and in constant mesh with said primary shaft gear wheel, a primary sprocket fixed upon the primary shaft, a secondary sprocket loosely mounted about the secondary shaft, an endless chain connecting said two sprockets for driving said secondary sprocket in the reverse direction to the normal forward direction of rotation of the secondary shaft, and a clutch device on said secondary shaft for coupling said secondary sprocket in driving engagement with the secondary shaft to reverse the rotation of the feed rollers when the clutch means connecting the primary shaft with its feed roller and gear wheel is disconnected.

2. In a spring unit lacing machine of the type referred to, means for reversing the direction of rotation of the helical wire feed rollers comprising; a primary driving shaft which is uni-directional in rotation, a feed roller mounted thereon, a gear wheel mounted on the primary shaft, clutch means for simultaneously connecting said primary shaft in driving engagement with said feed roller and gear wheel, a secondary shaft in spaced parallel relationship with said primary shaft, a feed roller fixed on said secondary shaft, a gear wheel fixed upon said secondary shaft and in constant mesh with said primary shaft gear wheel, a primary sprocket fixed upon the primary shaft, a secondary sprocket loosely mounted about the secondary shaft, an endless chain connecting said two sprockets for driving said secondary sprocket in the reverse direction to the normal forward direction of rotation of the secondary shaft, said clutch device comprising; a sleeve fixed upon said secondary shaft and having said secondary sprocket loosely mounted thereon, a projection on one face of said secondary sprocket, a key slidably mounted in said sleeve and movable radially into the path of movement of said projection to transmit drive from the secondary sprocket to the secondary shaft.

3. In a spring unit lacing machine of the type referred to, means for reversing the direction of rotation of the helical wire feed rollers comprising; a primary driving shaft which is uni-directional in rotation, a feed roller mounted thereon, a gear wheel mounted on the primary shaft, clutch means for simultaneously connecting said primary shaft in driving engagement with said feed roller and gear wheel, a secondary shaft in spaced parallel relationship with said primary shaft, a feed roller fixed on said secondary shaft, a gear wheel fixed upon said secondary shaft and in constant mesh with said primary shaft gear wheel, a primary sprocket fixed upon the primary shaft, a secondary sprocket loosely mounted about the secondary shaft, an endless chain connecting said two sprockets for driving said secondary sprocket in the reverse direction to the normal forward direction of rotation of the secondary shaft, said clutch device comprising; a sleeve fixed upon said secondary shaft and having the secondary sprocket loosely mounted thereon, a projection on one face of said secondary sprocket, said sleeve having a diametrically extending slot, a key slidably mounted in said slot and movable radially into the path of movement of said projection to transmit drive from the secondary sprocket to the secondary shaft, a cap member secured to the end of said sleeve and having an opening therethrough and a peg extending axially from said key and projecting through said opening in the cap member whereby said key may be manually slidden in the slot in said sleeve.

4. Reversing means in accordance with claim 1 wherein the clutch means for connecting the primary shaft in driving engagement with its feed roller and gear wheel comprises; an axially movable collar disposed about the primary shaft, a pair of diametrically opposed radially inwardly projecting pegs on said collar, a sleeve member surrounding the primary shaft and fixed at its ends to the primary shaft gear wheel and the primary shaft feed roller, said sleeve member having axially extending slots in its wall within which said driving pegs engage, a driving sleeve fixed upon the primary shaft and having axially extending slots formed in its wall, said collar being movable into a position in which the pegs thereon engage the slots in said driving sleeve to connect the primary shaft in driving engagement with its feed roller and gear wheel.

References Cited in the file of this patent

UNITED STATES PATENTS

| | | |
|---|---|---|
| 898,268 | Russell et al. | Sept. 8, 1908 |
| 1,007,957 | McCausland | Nov. 7, 1911 |